US012546295B2

(12) United States Patent
Tan et al.

(10) Patent No.: US 12,546,295 B2
(45) Date of Patent: Feb. 10, 2026

(54) ION THRUSTER AND METHOD FOR FABRICATION THEREOF

(71) Applicant: NORTH UNIVERSITY OF CHINA, Shanxi (CN)

(72) Inventors: Qiulin Tan, Shanxi (CN); Yongwei Zhang, Shanxi (CN); Lei Zhang, Shanxi (CN); Wendong Zhang, Shanxi (CN)

( * ) Notice: Subject to any disclaimer, the term of this patent is extended or adjusted under 35 U.S.C. 154(b) by 96 days.

(21) Appl. No.: 17/763,277

(22) PCT Filed: Oct. 15, 2019

(86) PCT No.: PCT/CN2019/111311

§ 371 (c)(1),
(2) Date: Mar. 24, 2022

(87) PCT Pub. No.: WO2021/056624

PCT Pub. Date: Apr. 1, 2021

(65) Prior Publication Data

US 2022/0341404 A1 Oct. 27, 2022

(30) Foreign Application Priority Data

Sep. 25, 2019 (CN) ......................... 201910892803.5

(51) Int. Cl.
*F03H 1/00* (2006.01)

(52) U.S. Cl.
CPC ................................. *F03H 1/0037* (2013.01)

(58) Field of Classification Search
CPC ..... F03H 1/0037; F03H 1/0043; F03H 1/0056
See application file for complete search history.

(56) References Cited

U.S. PATENT DOCUMENTS 6,250,070 B1 * 6/2001 Kreiner ................. F03H 1/0043
60/202
7,494,557 B1 * 2/2009 Peterson .............. H05K 1/0272
264/43

OTHER PUBLICATIONS

Roddy "Development of a Monolithic Ceramic Electrostatic Ion Thruster for Interplanetary SmallSat Missions" (Year: 2018).*

* cited by examiner

*Primary Examiner* — Arun Goyal
*Assistant Examiner* — William L Breazeal
(74) *Attorney, Agent, or Firm* — TIANCHEN LLC.; Yuan R. Li

(57) ABSTRACT

Provided are an ion thruster and a fabrication method thereof. The method for fabricating the ion thruster comprises: stacking and laminating a plurality of prefabricated ceramic chips (p) to form a front portion (51); stacking and laminating a plurality of prefabricated green ceramic chips (p) to form a rear portion (B); assembling the front portion (51) and the rear portion (B) and placing in a sintering mold, and allowing the front portion (51) to be closely fitted with a tapered portion (b1) of the rear portion (B); placing a main cathode (1) into a cathode hole (k1) on the front portion and filling the cathode hole (k1) with a ceramic slurry to fix the main cathode (1); and placing the sintering mold in a heating furnace for sintering. For the ion thruster, a modular processing method is adopted. A method of stacking a plurality of prefabricated green ceramic chips (p) together and laminating them is used when each module is manufactured. The present application has the advantages of a simple process and low cost, and the fabricated ion thruster is small in size and has good high-temperature resistance.

10 Claims, 8 Drawing Sheets

ION THRUSTER AND METHOD FOR FABRICATION THEREOF

CROSS-REFERENCE TO RELATED APPLICATION

The present disclosure is US national phase of a PCT application under PCT/CN2019/111311, which claims the priority of Chinese patent application under CN201910892803.5 filed on Sep. 25, 2019. The contents of the aforementioned application are incorporated herein by reference in their entirety.

TECHNICAL FIELD

The present application relates to the technical field of space propulsion, in particular to an ion thruster and a fabrication method thereof.

BACKGROUND

An ion thruster, also known as ion engine, is a kind of space electric propulsion technology, and is widely used in space propulsion of small satellites, such as attitude control, position maintenance, orbit maneuvering and space flight due to small thrust and high specific impulse.

As microsatellites are widely used in communication, remote sensing, interplanetary exploration and other fields, the application demand for ion thrusters is increasing, and ion thrusters with simple preparation process and low cost have become the first choice. In addition, due to the complex space environment in which microsatellites work, especially the large temperature variation range, higher requirements are put forward for the high temperature resistance of the ion thrusters.

SUMMARY

The present application provides an ion thruster and a fabrication method thereof. The fabrication method is simple in process and low in cost, and the ion thruster fabricated by the method has good high temperature resistance.

A method for fabricating an ion thruster according to the present application includes: step 101, stacking and laminating a plurality of prefabricated green ceramic chips to form a front portion, the front portion including a cathode hole and an air intake hole; step 102, stacking and laminating a plurality of prefabricated green ceramic chips to form a rear portion, the rear portion including a middle portion in which a reaction chamber is located and a tail portion, the middle portion including a tapered portion and a barrel portion; a prefabricated carbon block having a profile matched with a profile of the reaction chamber being placed inside the reaction chamber and an anode metal layer being formed on the surface of the prefabricated carbon block at a position corresponding to the tapered portion; and the tail portion including an accelerating grid cathode and an accelerating grid anode having a plurality of jet orifices and oppositely arranged at a certain distance; a lead-out electrode passing through the tapered portion, and a permanent magnet slot being formed on an outer surface of the middle portion; step 103, assembling the front portion and the rear portion and placing in a sintering mold, and allowing the front portion to be closely fitted with the tapered portion of the rear portion such that the cathode hole and the air intake hole communicate with the reaction chamber; step 104, placing a main cathode into the cathode hole and filling the cathode hole with a ceramic slurry to fix the main cathode; and step 105, placing the sintering mold in a heating furnace for sintering.

In an embodiment, the step 101 further includes: cutting a green ceramic tape to form a green ceramic chip; forming a via and/or an opening at a designated position of the green ceramic chip to form a prefabricated green ceramic chip; filling the via and/or opening with a carbon film; stacking and laminating a plurality of the prefabricated green ceramic chips filled with the carbon films, communicating the via to form a cathode hole, and communicating the openings and the via to form an air intake hole.

In an embodiment, the step 102 specifically includes: cutting a green ceramic tape to form a green ceramic chip; forming an opening and/or a via at a designated position of the green ceramic chip to form a prefabricated green ceramic chip; printing a lead-out electrode on the prefabricated green ceramic chip; stacking a plurality of the prefabricated green ceramic chips with gradually increasing outline sizes to form the tapered portion, the lead-out electrode being formed on the tapered portion; stacking and laminating a plurality of the prefabricated green ceramic chips having the same outline sizes as the largest prefabricated green ceramic chip of the tapered portion to form the barrel portion, communicating the via of the tapered portion and the via of the barrel portion to form a reaction chamber, and allowing the openings to form the permanent magnet slot; filling the via of the prefabricated green ceramic chip with a carbon film, printing a grid metal layer on the surface of the prefabricated green ceramic chip filled with the carbon film to form the accelerating grid cathode and the accelerating grid anode, and allowing via filled with carbon film to form jet orifices; sequentially stacking and laminating the accelerating grid anode, the prefabricated green ceramic chips, and the accelerating grid cathode to form the tail portion; and sequentially stacking together and laminating tapered portion, the barrel portion, the prefabricated carbon block, and the tail portion.

In an embodiment, the step 101 further includes: before laminating the prefabricated green ceramic chips, forming a first temperature sensor, a first pressure sensor and a vibration sensor. The step 102 further includes: before laminating the prefabricated green ceramic chips, forming a second temperature sensor and a second pressure sensor.

In an embodiment, the step of forming the first temperature sensor or the second temperature sensor specifically includes: forming a dielectric via on a first green ceramic chip; filling the dielectric via with a temperature-sensitive ceramic; printing an upper electrode on a surface facing the first green ceramic chip of an adjacent second green ceramic chip disposed above the first green ceramic chip, the upper electrode covering the dielectric via and extending to an edge of the second green ceramic chip; and printing a lower electrode on a surface facing the first green ceramic chip of an adjacent third green ceramic chip disposed below the first green ceramic chip, the lower electrode covering the dielectric via and extending to an edge of the third green ceramic chip.

In an embodiment, the step of forming the first pressure sensor or the second pressure sensor specifically includes: forming a dielectric via on a first green ceramic chip; filling the dielectric via with a carbon film; printing an upper electrode on a surface facing the first green ceramic chip of an adjacent second green ceramic chip disposed above the first green ceramic chip, the upper electrode covering the dielectric via and extending to an edge of the second green ceramic chip; and printing a lower electrode on a surface facing the first green ceramic chip of an adjacent third green ceramic chip disposed below the first green ceramic chip, the lower electrode covering the dielectric via and extending to an edge of the third green ceramic chip.

In an embodiment, the step of forming the vibration sensor specifically includes: forming a crossed micro-beam on a first green ceramic chip; forming a first dielectric via at a position corresponding to the crossed micro-beam on a second green ceramic chip disposed below the first green ceramic chip; forming a second dielectric via at a position corresponding to the crossed micro-beam on a third green ceramic chip disposed above the first green ceramic chip; filling the first dielectric via and the second dielectric via with a carbon film, printing a lower electrode on the crossed micro-beam, the lower electrode extending to an edge of the first green ceramic chip; printing an upper electrode on a surface facing the third green ceramic chip of a fourth green ceramic chip disposed above the third green ceramic chip, the upper electrode covering the second dielectric via and extending to an edge of the fourth green ceramic chip.

In an embodiment, the method further includes placing a permanent magnet in the permanent magnet slot.

An ion thruster according to the present application is fabricated by the above-mentioned method.

In an embodiment, the above-mentioned ion thruster further includes a neutralizer pipeline located on a side of the tail portion and configured to eject negatively charged ions around the tail portion.

In the method for fabricating the ion thruster and the ion thruster fabricated by using the method according to the present application, a modular processing method is adopted. First, the front portion of the ion thruster is manufactured, then the rear portion is processed, and finally the two portions are butted and sintered. In the manufacture of each module, a method of stacking a plurality of prefabricated green ceramic chips together and laminating is adopted. The method is simple in process, easy to implement, and ceramic materials are cheap, so that the manufacture cost of the ion thruster is significantly reduced. In addition, the sintering, that is, the co-fired process used therein may be a high-temperature co-fired process or a low-temperature co-fired process, so that the sintered ceramic material has the advantages of corrosion resistance, high temperature resistance, long service life, good thermal conductivity, etc. Therefore, the ion thruster produced also has good high temperature resistance.

In addition, the green ceramic chips formed by the cutting process can be very thin, and the holes formed by the drilling process can also be very small. Therefore, after being stacked and laminated, the ion thruster can have very small overall size, which may reach a millimeter level, or even micrometer level, and may be applied to different occasions.

BRIEF DESCRIPTION OF THE DRAWINGS

In order to more clearly illustrate the technical solutions disclosed in the embodiments of the present application or the prior art, drawings needed in the descriptions of the embodiments or the prior art will be briefly described below. The drawings in the following description are only some of the embodiments of the present application, and other drawings can be obtained according to these drawings without any creative effort for those skilled in the art.

DETAILED DESCRIPTION

In order to illustrate the objectives, technical solutions and advantages of the present application clearly, the technical solutions in the embodiments of the present application will be described clearly and completely in conjunction with the accompanying drawings in the embodiments of the present application. The described embodiments are part of the embodiments of the present application, rather than all of the embodiments. All other embodiments obtained by a person of ordinary skill in the art based on the embodiments of the present utility model without any creative effort fall within the protection scope of the present utility model.

Figure 1:
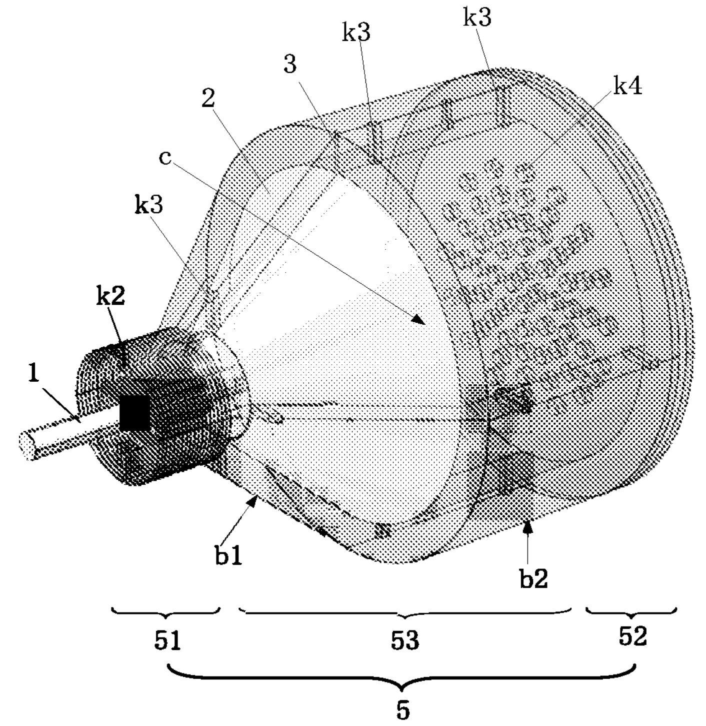
FIG. 1 is a perspective view of an ion thruster according to an embodiment of the present application.
Figure 2:
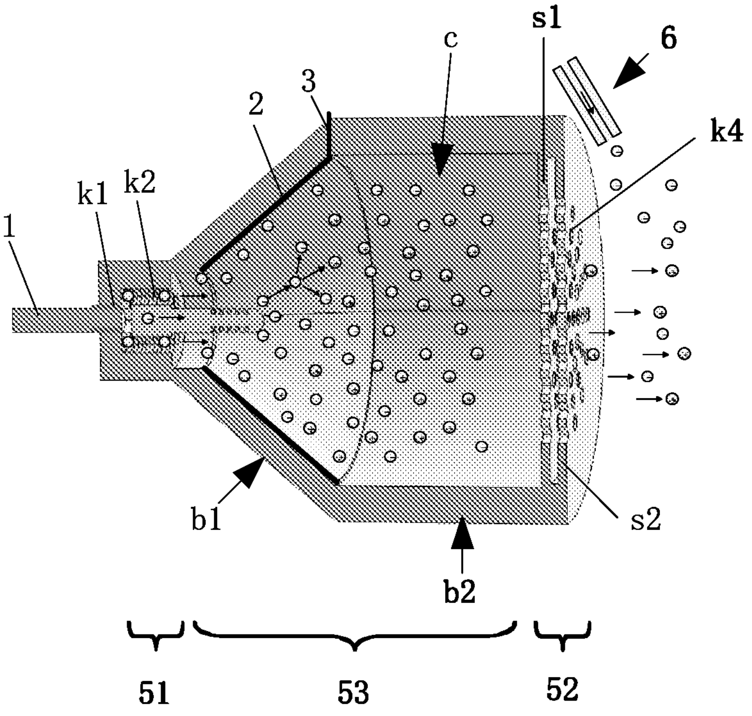
FIG. 2 is a schematic cross-sectional view of the ion thruster shown in FIG. 1.
Figure 3:
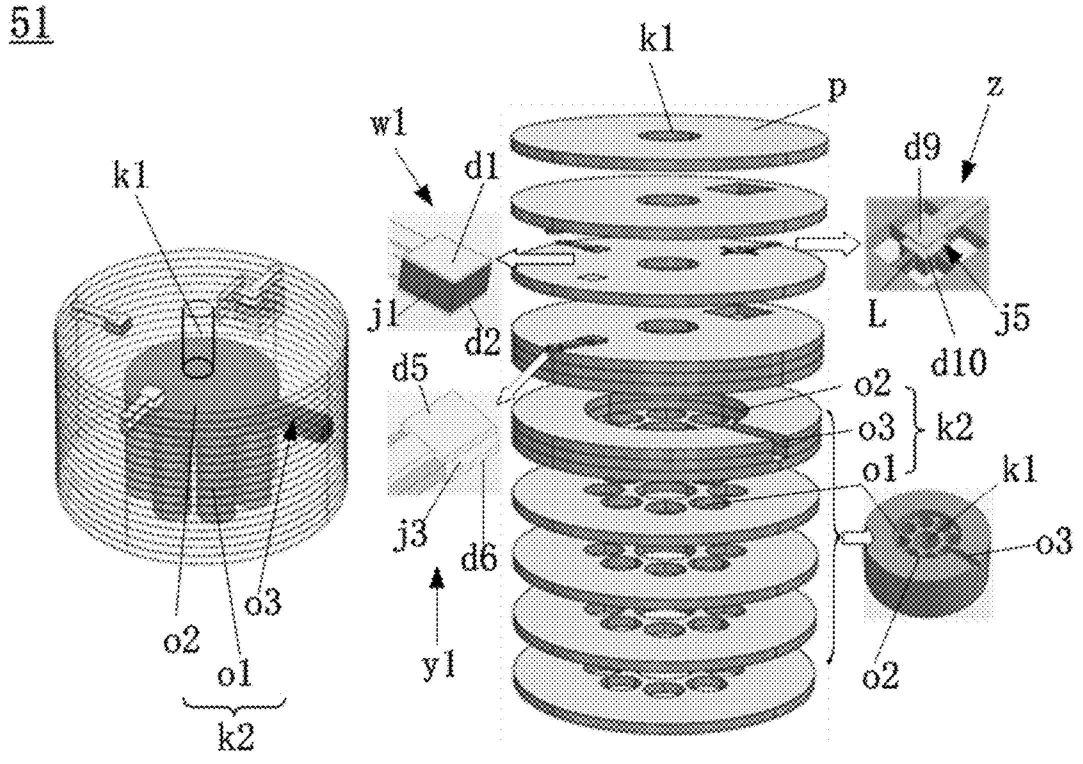
FIG. 3 is schematic diagrams before and after laminating each green ceramic chip in the front portion of the ion thruster shown in FIG. 1.
Figure 4:
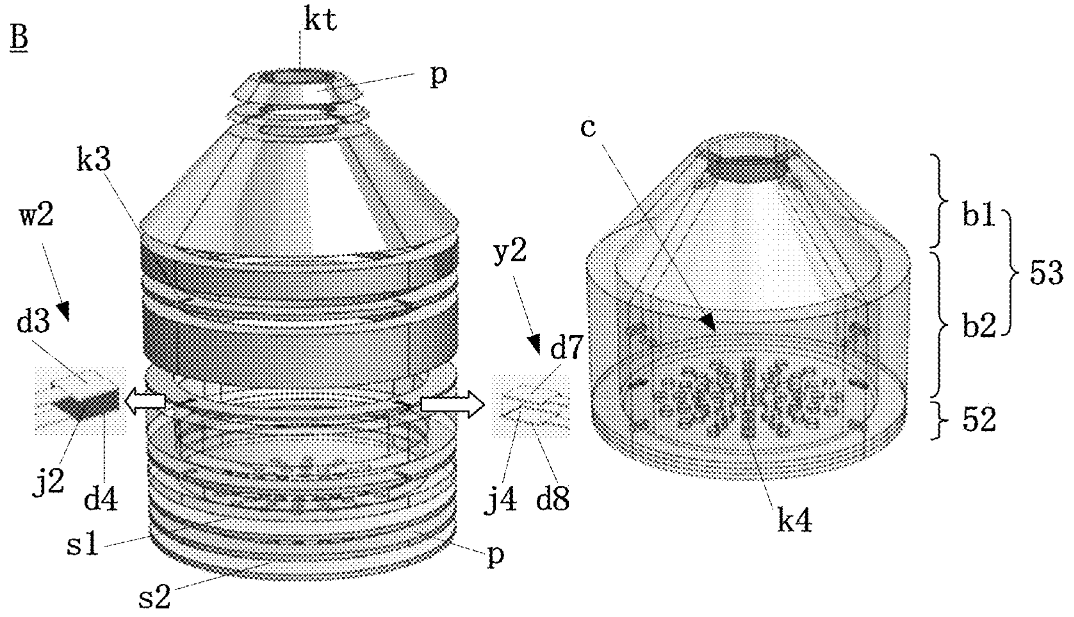
FIG. 4 is schematic diagrams before and after laminating each green ceramic chip in the rear portion of the ion thruster shown in FIG. 1.
Figure 5:
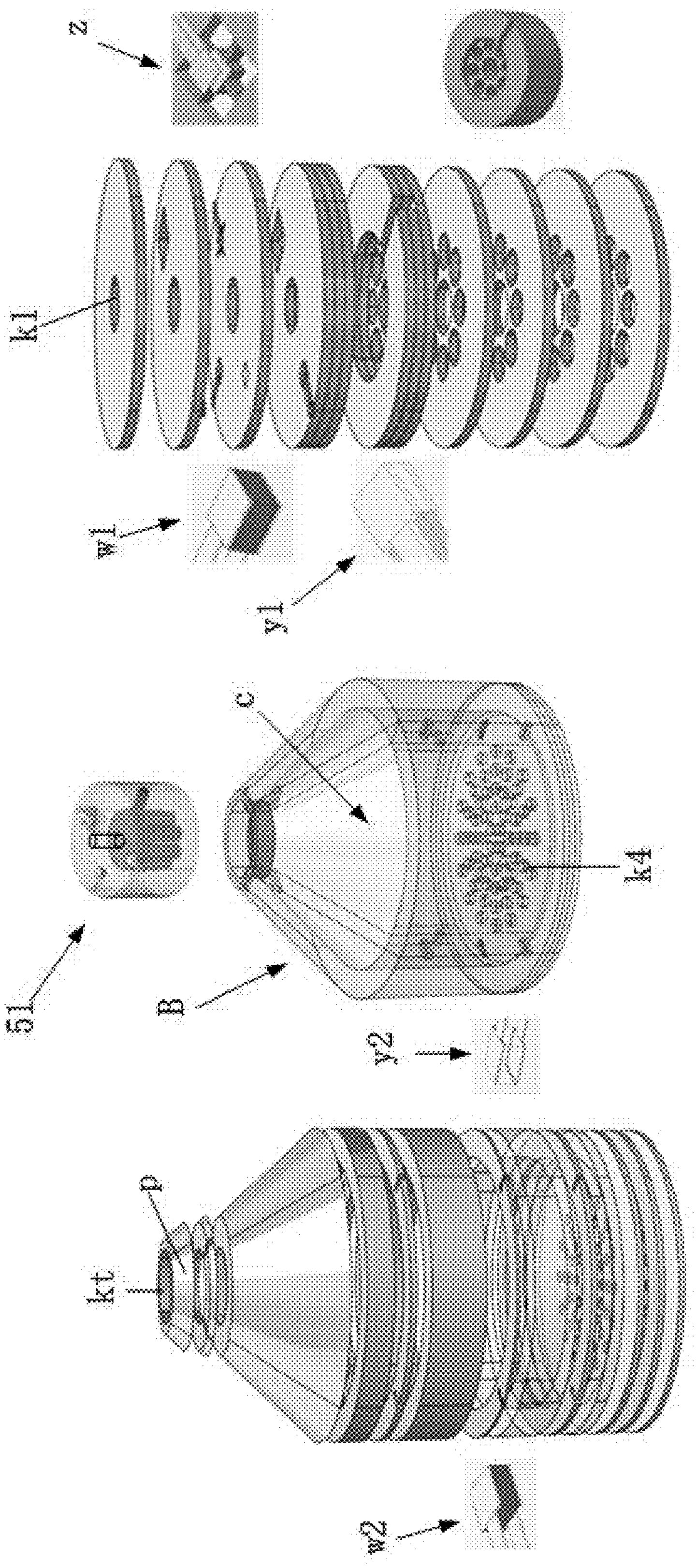
FIG. 5 is a schematic diagram showing the assembly of the front and rear portions of the ion thruster shown in FIG. 1.
Figure 6:
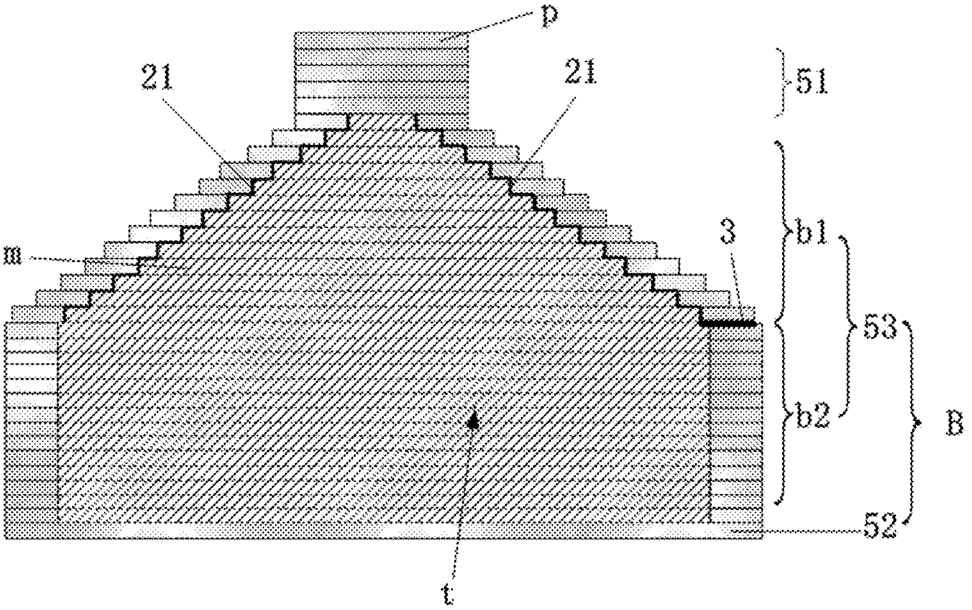
FIG. 6 is a schematic cross-sectional view of the assembled ion thruster shown in FIG. 5.
Figure 7:
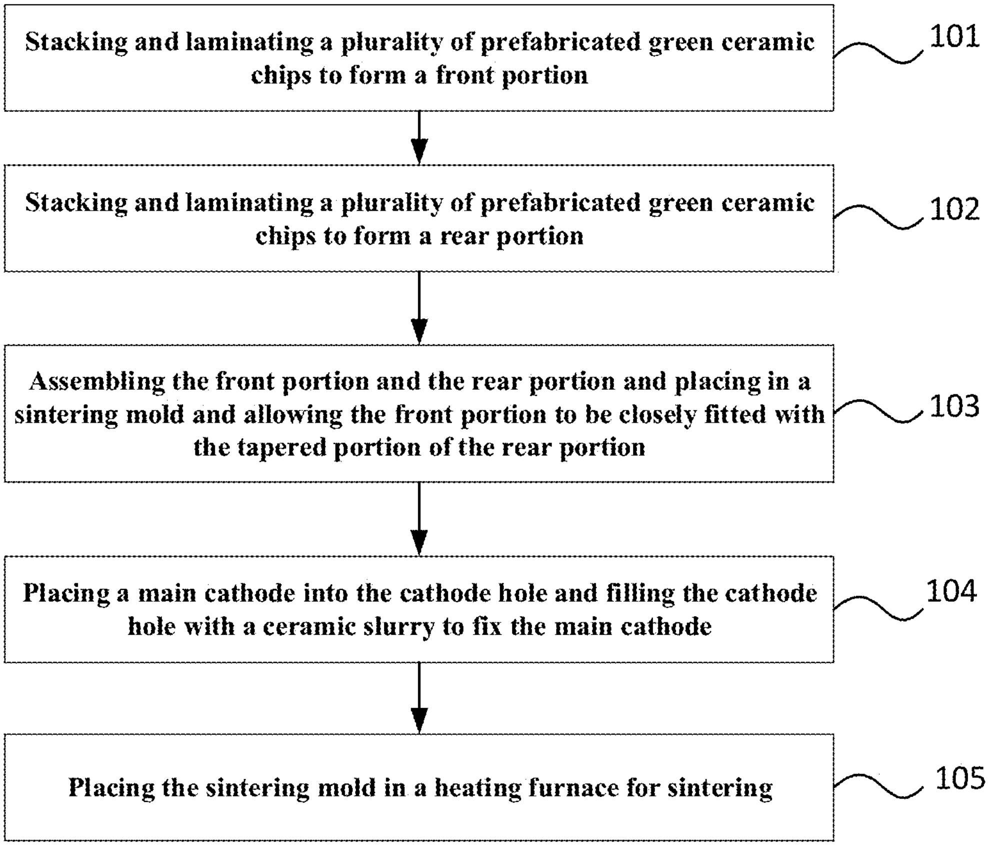
FIG. 7 is a flow chart of a method for fabricating an ion thruster according to an embodiment of the present application.
Figure 8:
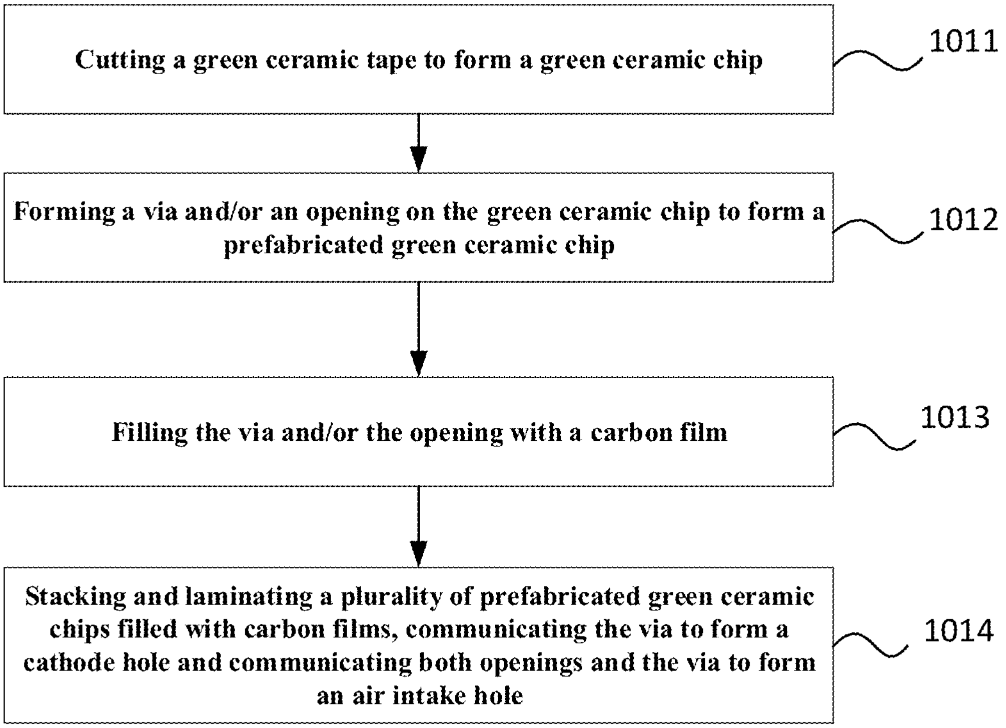
FIG. 8 is a flowchart of a method for forming a front portion according to an embodiment of the present application.
Figure 9:
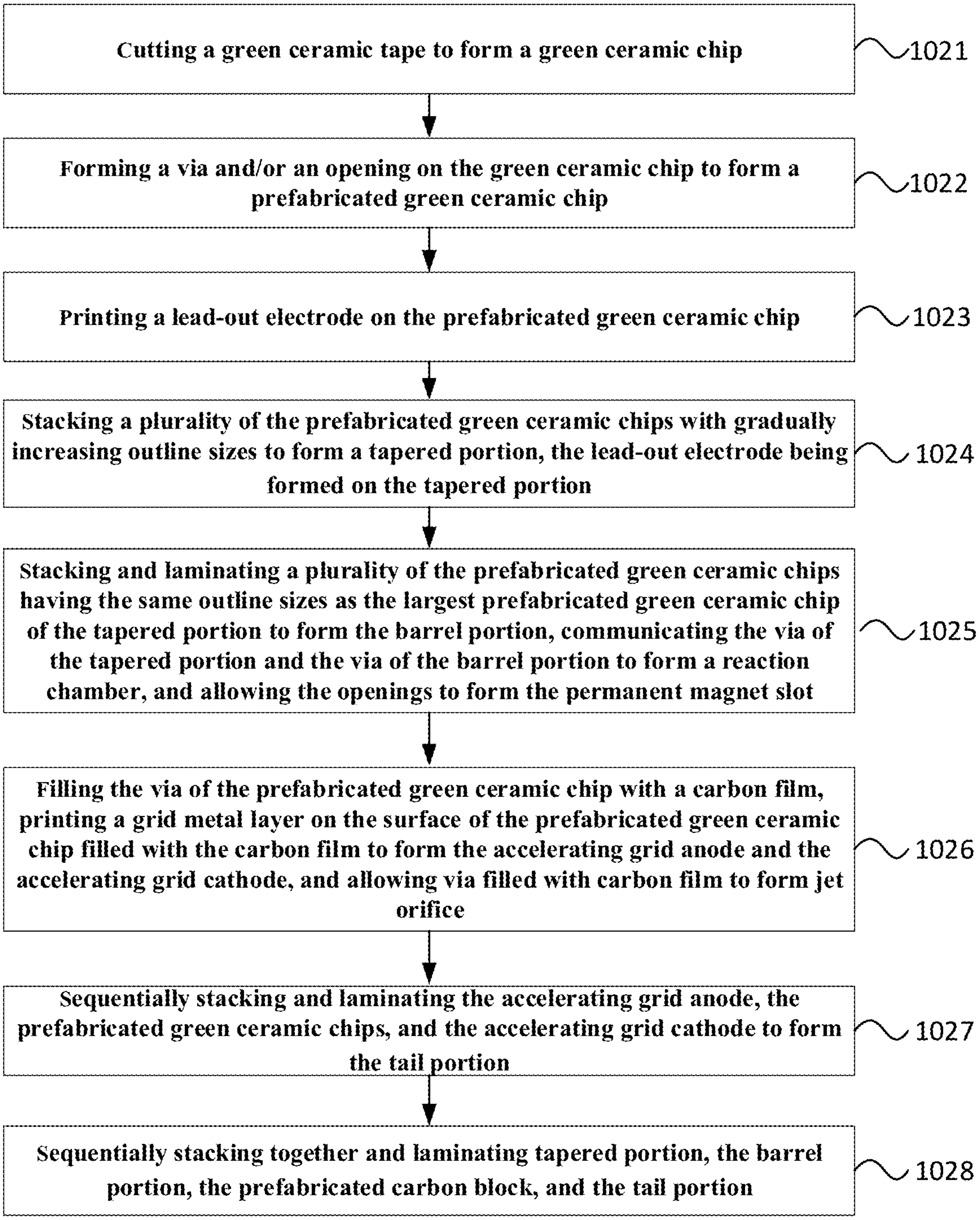
FIG. 9 is a flowchart of a method for forming a rear portion according to an embodiment of the present application.
Figure 10:
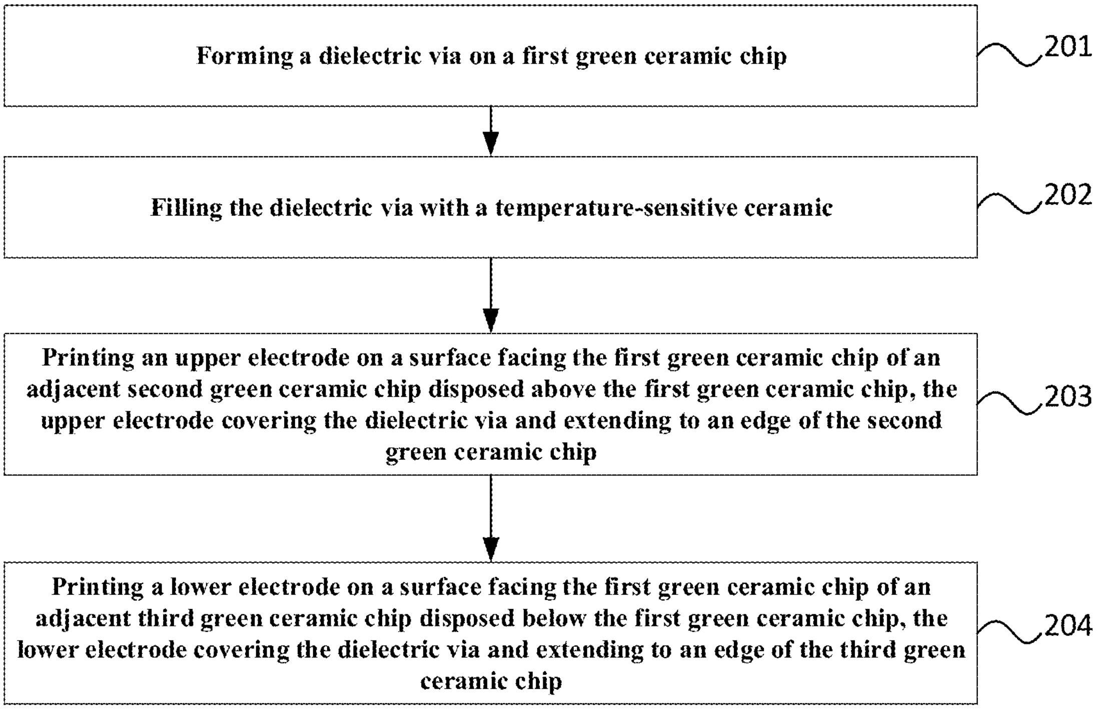
FIG. 10 is a flowchart of a method for forming a temperature sensor according to an embodiment of the present application.
Figure 11:
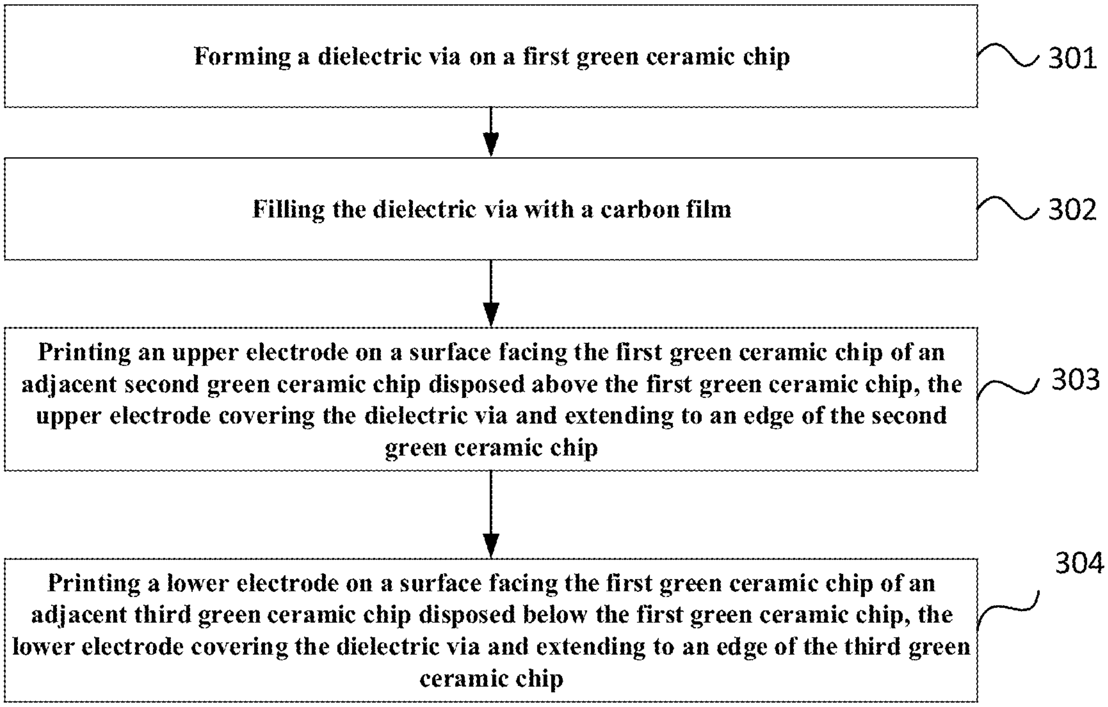
FIG. 11 is a flowchart of a method for forming a pressure sensor according to an embodiment of the present application.
Figure 12:
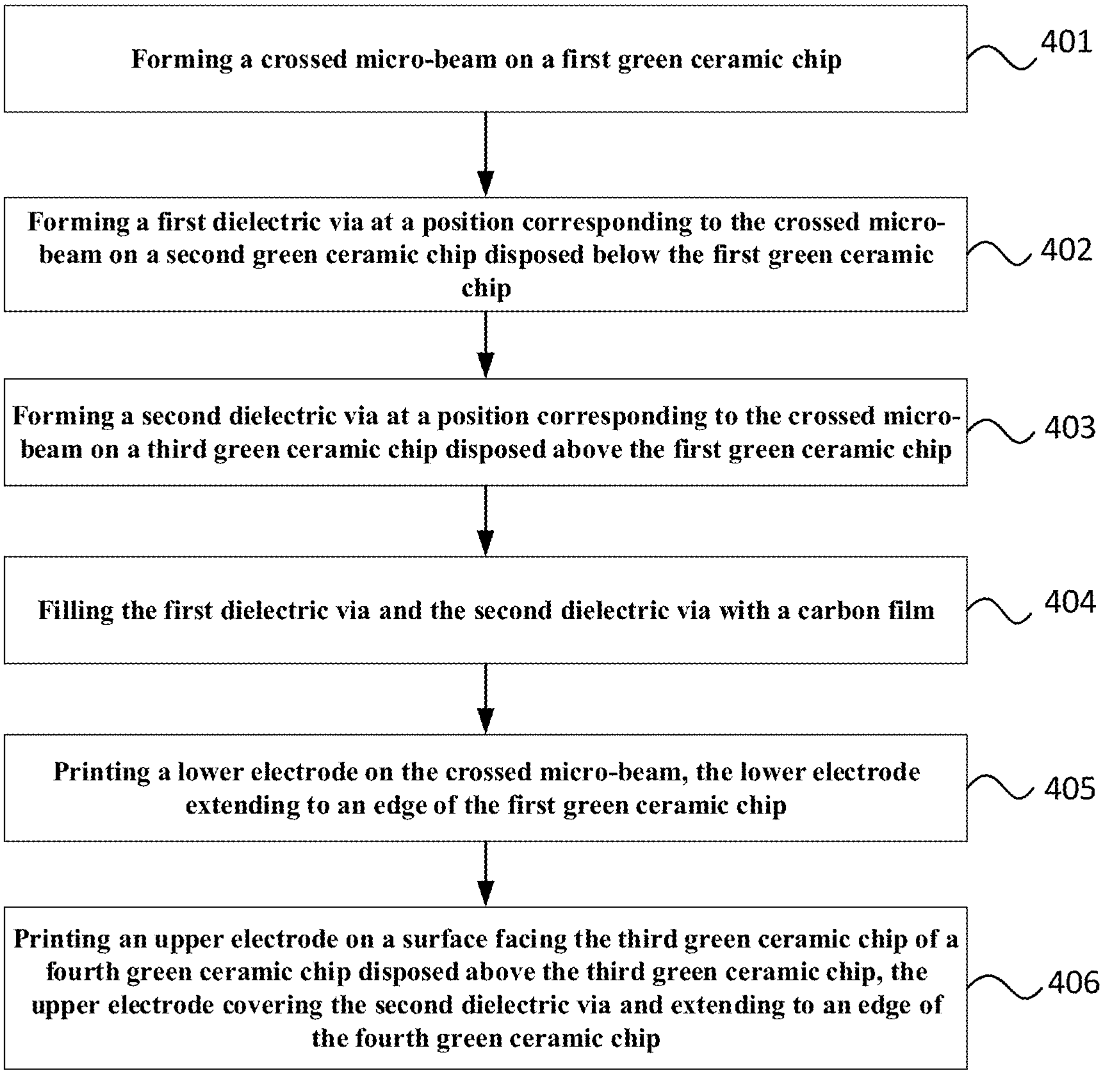
FIG. 12 is a flowchart of a method for forming a vibration sensor according to an embodiment of the present application.

In order to explain the technical solution of the present application clearly, the embodiments of the present application are described in detail in conjunction with the accompanying drawings FIG. 1 is a perspective view of an ion thruster according to an embodiment of the present application; FIG. 2 is a schematic cross-sectional view of the ion thruster shown in FIG. 1; FIG. 3 is schematic diagrams before and after laminating each green ceramic chip in the front portion of the ion thruster shown in FIG. 1; FIG. 4 is schematic diagrams before and after laminating each green ceramic chip in the rear portion of the ion thruster shown in FIG. 1; FIG. 5 is a schematic diagram showing the assembly of the front and rear portions of the ion thruster shown in FIG. 1; FIG. 6 is a schematic cross-sectional view of the assembled ion thruster shown in FIG. 5; FIG. 7 is a flow chart of a method for fabricating an ion thruster according to an embodiment of the present application; FIG. 8 is a flowchart of a method for forming a front portion according to an embodiment of the present application; FIG. 9 is a flowchart of a method for forming a rear portion according to an embodiment of the present application; FIG. 10 is a flowchart of a method for forming a temperature sensor according to an embodiment of the present application; FIG. 11 is a flowchart of a method for forming a pressure sensor according to an embodiment of the present application; and FIG. 12 is a flowchart of a method for forming a vibration sensor according to an embodiment of the present application.

An embodiment of the present application provides a method for fabricating an ion thruster. As shown in FIGS. 1 to 7, the method includes the following steps.

Step 101, stacking and laminating a plurality of prefabricated green ceramic chips p to form a front portion 51, and the front portion 51 including a cathode hole k1 and an air intake hole k2.

The green ceramic chips can be obtained by cutting ALN (aluminum nitride) or $AL_2O_3$ (aluminum oxide) green ceramic tapes. The green ceramic chips also need to be drilled to form the required via and opening at the designated positions by a drilling process to form prefabricated green ceramic chips. The prefabricated green ceramic tape in the present application is not limited to be made of ALN or $AL_2O_3$, and can also be made of other materials known to those skilled in the art.

Step 102, stacking and laminating a plurality of prefabricated green ceramic chips p to form a rear portion B, the rear portion B including a middle portion 53 in which a reaction chamber c is located and a tail portion 52, the middle portion 53 including a tapered portion bl and a barrel portion b2; a prefabricated carbon block t having a profile matched with a profile of the reaction chamber c being placed inside the reaction chamber c and an anode metal layer 21 being formed on the surface of the prefabricated carbon block t at a position corresponding to the tapered portion b1; and the tail portion 52 including an accelerating grid anode s1 and an accelerating grid cathode s2 having a plurality of jet orifices k4 and oppositely arranged at a certain distance; a lead-out electrode 3 passing through the tapered portion b1, and a permanent magnet slot k3 being formed on an outer surface of the middle portion and configured to place a permanent magnet, The prefabricated carbon block t is formed by stacking and laminating multiple layers of carbon films m. The prefabricated carbon block t has a profile matching the profile of reaction chamber c, so that in the process of forming the rear portion B, the prefabricated carbon block t can be filled in the reaction chamber c, such that the laminated structure will be prevented from deforming due to existence of the cavity when the prefabricated green ceramic chips p are laminated. In addition, an anode metal layer 21 is formed on the surface of the prefabricated carbon block t at a position corresponding to the tapered portion bl, and as the prefabricated carbon block t volatilizes in the subsequent sintering step, the anode metal layer 21 is adhered to an inner surface of the tapered portion b1 and shaped to form a main anode 2. The main anode 2 is electrically connected to an end of a lead-out electrode 3 passing through the tapered portion b1, and the other end of the lead-out electrode 3 extends to an outer surface of the tapered portion b1 for being electrically connected with an anode of an external power supply.

Step 103, assembling the front portion 51 and the rear portion B and placing in a sintering mold and allowing the front portion 51 to be closely fitted with the tapered portion bl of the rear portion B such that the cathode hole k1 and the air intake hole k2 communicate with the reaction chamber c.

Step 104, placing a main cathode 1 into the cathode hole k1 and filling the cathode hole with a ceramic slurry to fix the main cathode 1.

Step 105, placing the sintering mold in a heating furnace for sintering.

The sintering process, that is, the co-fired process may be a low temperature co-fired process (LTCC) or a high temperature co-fired process (HTCC) for sintering the laminated prefabricated green ceramic chips into one body to form a body 5 of ceramic material and the main cathode 1, the main anode 2, and the lead-out electrode 3 fixed on the body 5

In the method for fabricating the ion thruster according to the present application, a modular processing method is adopted. First, the front portion of the ion thruster is manufactured, then the rear portion is processed, and finally the two portions are butted and sintered. In the manufacture of each module, a method of stacking a plurality of prefabricated green ceramic chips together and laminating is adopted. The method is simple in process, easy to implement, and ceramic materials are cheap, so that the manufacture cost of the ion thruster is significantly reduced. In addition, the sintering, that is, the co-fired process used therein may be a high-temperature co-fired process or a low-temperature co-fired process, so that the sintered ceramic material has the advantages of corrosion resistance, high temperature resistance, long service life, good thermal conductivity, etc. Therefore, the ion thruster produced also has good high temperature resistance.

In addition, the green ceramic chips formed by the cutting process can be very thin, and the holes formed by the drilling process can also be very small. Therefore, after being stacked and laminated, the ion thruster can have very small overall size, which may reach a millimeter level, or even micrometer level, and may be applied to different occasions. The body of the traditional ion thruster is mostly made of metal materials, and is mainly fabricated by molding the metal material. The ion thruster fabricated by the traditional method cannot reach the millimeter level, and it is impossible to manufacture an ion thruster with a small size.

In the above method, the method for forming the front portion in step 101 may specifically include the following steps as shown in FIG. 8.

Step 1011, cutting a green ceramic tape to form a green ceramic chip.

The green ceramic tape may be made of ALN (aluminum nitride) or $AL_2O_3$ (aluminum oxide), but the present application is not limited thereto.

Step 1012, forming a via and/or an opening on the green ceramic chip to form a prefabricated green ceramic chip p.

As shown in FIGS. 3 and 5, the via (such as a cathode hole k1) and the opening (such as gas passage o3) are formed by penetrating through the green ceramic chip. The opening will open the edges of the green ceramic chips, while the via will not open the edges of the green ceramic chips.

Step 1013, filling the via and/or the opening with a carbon film.

Filling the carbon film is to fill the cavity on the prefabricated green ceramic chip fully, so that the laminated structure will be prevented from deforming due to existence of the cavity when the prefabricated green ceramic chips are laminated. Some prefabricated green ceramic chips p have only an opening or only a via, and some prefabricated green ceramic chips p have both opening and via. Therefore, when a prefabricated green ceramic chip p is filled with the carbon film, either a via or an opening may only need to be filled, or both the via and the opening need to be filled.

Step 1014, stacking and laminating a plurality of prefabricated green ceramic chips filled with carbon films, communicating the via to form a cathode hole k1 and communicating both openings and the via to form an air intake hole k2.

As shown in FIGS. 3 and 5, a circular hole in the center of each prefabricated green ceramic chip p are communicated to form a cathode hole k1 for accommodating the main cathode 1. A large circular hole is also formed on the two prefabricated green ceramic chips p formed with the opening at the same time, and communicates with the opening. The prefabricated green ceramic chip p below the opening is also surrounded by 8 small circular circles around the central circular hole. When these prefabricated green ceramic chips are stacked and laminated, the two stacked openings communicate to form a gas passage o3 in the air intake hole k2, and the plurality of stacked large circular holes form the large circular hole o2 in the air intake hole k2. A plurality of stacked small circular holes form a small circular hole of in the air intake hole k2, and the gas passage o3, the large circular hole o2, and the small circular hole o1 communicate with each other to form the air intake hole k2.

It should be noted that the shape, size, number and arrangement of the vias and openings are not limited to those shown in the figures, and may be any shape, size, number and arrangement known to those skilled in the art.

In the above method for fabricating the ion thruster, the method for forming the rear portion in step 102 may specifically include the following steps as shown in FIG. 9.

Step 1021, cutting a green ceramic tape to form a green ceramic chip.

The green ceramic tape may be made of ALN (aluminum nitride) or $AL_2O_3$ (aluminum oxide), but the present application is not limited thereto.

Step 1022, forming an opening and/or a via kt on the green ceramic chip to form a prefabricated green ceramic chip.

As shown in FIGS. 4 and 5, the via kt and the opening (such as a permanent magnet slot o3) are formed by penetrating through the green ceramic chip. The opening will open the edges of the green ceramic chips, while the via kt will not open the edges of the green ceramic chips.

Step 1023, printing a lead-out electrode on the prefabricated green ceramic chip.

The lead-out electrode 3 is configured to extend a main anode 2 on an inner wall surface of the tapered portion b1 to the outer wall of the tapered portion b1, therefore, a wall of the via on the prefabricated green ceramic chip on which the lead electrode 3 is a part of an inner wall of a tapered portion b1 to be formed; and the printed lead-out electrode 3 having an end reaching a wall of the via and another end reaching an outer surface of the prefabricated green ceramic chip.

Step 1024, stacking a plurality of the prefabricated green ceramic chips with gradually increasing outline sizes to form a tapered portion b1, the lead-out electrode 3 being formed on the tapered portion b1.

The plurality of prefabricated green ceramic chips p forming the tapered portion b1 include prefabricated green ceramic chips printed with lead-out electrodes, and these prefabricated green ceramic chips p have gradually increasing outline sizes, and are laminated to form a tapered portion b1 having a tapered outline.

Step 1025, stacking and laminating a plurality of the prefabricated green ceramic chips having the same outline sizes as the largest prefabricated green ceramic chip of the tapered portion to form the barrel portion b2, communicating the via of the tapered portion and the via of the barrel portion to form a reaction chamber c, and allowing the openings to form the permanent magnet slot k3

As shown in FIGS. 4 and 5, openings are formed on the three prefabricated green ceramic chips p, and four openings are formed on each of the prefabricated green ceramic chips p, and each opening is used to form a permanent magnet slot k3. These 12 permanent magnet slots k3 surround the outer wall of the barrel portion b2 and are evenly arranged for inserting permanent magnets with different magnetic properties, so as to form a magnetic field that makes the electrons do a cyclotron motion in the reaction chamber c through the action between adjacent opposite magnetic poles, thereby increasing a probability of the electrons colliding with the gas molecules of the fuel gas in the reaction chamber c.

It should be noted that the number and arrangement of the permanent magnet slots k3 are not limited to those shown in the figures, and other numbers and arrangements known to those skilled in the art can also be used in the present application.

Step 1026, filling the via of the prefabricated green ceramic chip with a carbon film, printing a grid metal layer on the surface of the prefabricated green ceramic chip filled with the carbon film to form the accelerating grid anode s1 and the accelerating grid cathode s2, and allowing via filled with carbon film to form jet orifice k4.

After the accelerating grid anode s1 and the accelerating grid cathode s2 are connected to a cathode of a power supply and an anode of the power supply, respectively, an electric field is formed between the accelerating grid anode s1 and the accelerating grid cathode s2 for accelerating the positively charged gas cations to be ejected from the jet orifice k4. The vias on the prefabricated green ceramic chips for forming the accelerating grid anode s1 and the accelerating grid cathode s2 form the jet orifice k4.

Before printing the grid metal layer on the surface of the prefabricated green ceramic chip, the via needed to be filled with a carbon film. The Filling the carbon film is to fill the cavity on the prefabricated green ceramic chip fully, so that the laminated structure will be prevented from deforming due to existence of the cavity when the prefabricated green ceramic chips are laminated.

Step 1027, sequentially stacking and laminating the accelerating grid anode s1, the prefabricated green ceramic chips p, and the accelerating grid cathode s2 to form the tail portion 52.

The accelerating grid anode s1 and the accelerating grid cathode s2 need to be spaced apart from each other by a predetermined distance such that an electric field is formed between them. Therefore, when forming the tail portion 52, a prefabricated green ceramic chip p is sandwiched between the accelerating grid anode s1 and the accelerating grid cathodes s2 to form a space and a via is formed on the prefabricated green ceramic chip, and is large enough to expose all the orifices k4, so as to facilitate the smooth ejection of gas cations.

Step 1028, sequentially stacking together and laminating tapered portion b1, the barrel portion b2, the prefabricated carbon block t, and the tail portion 52.

The prefabricated carbon block t is formed by stacking and laminating multiple layers of carbon films. The prefabricated carbon block t has a profile matching the profile of reaction chamber c, so that in the process of forming the rear portion B, the prefabricated carbon block t can be filled in the reaction chamber c, such that the laminated structure will be prevented from deforming due to existence of the cavity when the prefabricated green ceramic chips p are laminated. In addition, an anode metal layer 21 is formed on the surface of the prefabricated carbon block t at a position corresponding to the tapered portion b1, and as the prefabricated carbon block t volatilizes in the subsequent sintering step, the anode metal layer 21 is adhered to an inner surface of the tapered portion b1 and shaped to form a main anode 2. The main anode 2 is electrically connected to an end of the lead-out electrode 3 passing through the tapered portion b1, and the other end of the lead-out electrode 3 extends to an outer surface of the tapered portion b1 for being electrically connected with an anode of an external power supply.

In the method, the step 101 for forming the front portion 51 may further include: before laminating the prefabricated green ceramic chips, forming a first temperature sensor w1, a first pressure sensor y1 and a vibration sensor z. The step 102 for forming the rear portion B may further include: before laminating the prefabricated green ceramic chips, forming a second temperature sensor w2 and a second pressure sensor y2.

The first temperature sensor w1, the first pressure sensor y1 and the vibration sensor z formed on the front portion 51 may be configured to detect the temperature, pressure and vibration information of the environment where the ion thruster is located, respectively so as to prevent the ion thruster from being damaged by a severe environment. The second temperature sensor w2 and the second pressure sensor y2 formed in the rear portion B may be configured to detect the temperature and pressure information inside the reaction chamber c of the ion thruster so as to monitor a normal operation of the ion thruster.

Specifically, the methods for forming the first temperature sensor w1 and the second temperature sensor w2 are similar, and may include the following steps as shown in FIG. 10.

Step 201, forming a dielectric via on a first green ceramic chip.

The temperature sensor structurally includes an upper electrode, a lower electrode, and a temperature-sensitive ceramic between the upper electrode and the lower electrode. The temperature-sensitive ceramic is filled in the dielectric via. As shown in FIGS. 3 to 5, the green ceramic chip used to form the dielectric via is designated as the first green ceramic chip. When the first temperature sensor w1 is formed, the step of forming the dielectric via may be performed at the same time as or after the step 1012 of forming the prefabricated green ceramic chip. Similarly, when the second temperature sensor w2 is formed, the step of forming the dielectric via may also be performed at the same time as or after the step 1012 of forming the prefabricated green ceramic chip. When the step of forming the dielectric via is performed at the same time as the step 1012 of forming the prefabricated green ceramic chip, the first green ceramic chip may be the green ceramic chip formed by cutting a green ceramic tape, while when the step of forming the dielectric via is performed after the step 1012 of forming the prefabricated green ceramic chip, the first green ceramic chip may be the prefabricated green ceramic chip.

Step 202, filling the dielectric via with a temperature-sensitive ceramic.

The temperature-sensitive ceramic, also known as a thermo-sensitive ceramic, is a kind of material having a resistivity changing significantly with temperature. It can be used to fabricate temperature sensors and perform temperature measurement, line temperature compensation and frequency stabilization.

Step 203, printing an upper electrode on a surface facing the first green ceramic chip of an adjacent second green ceramic chip disposed above the first green ceramic chip, the upper electrode covering the dielectric via and extending to an edge of the second green ceramic chip.

As shown in FIGS. 3 to 5, an adjacent green ceramic chips disposed above the first green ceramic chip is designated as the second green ceramic chip, and an upper electrode is printed on the surface of the second green ceramic chip facing the first green ceramic chip. An upper electrode d1 is printed for the first temperature sensor w1, and an upper electrode d3 is printed for the second temperature sensor w2. The step of printing the upper electrode d3 on the second temperature sensor w2 may be performed at the same time as or after the step 1023 of printing the lead-out electrode.

The illustrated upper electrode includes a plate-shaped portion and a strip-shaped portion, the plate-shaped portion covers the dielectric via, and the strip-shaped portion extends to the edge of the second green ceramic chip for connecting an external circuit.

Step 204, printing a lower electrode on a surface facing the first green ceramic chip of an adjacent third green ceramic chip disposed below the first green ceramic chip, the lower electrode covering the dielectric via and extending to an edge of the third green ceramic chip.

As shown in FIGS. 3 to 5, an adjacent green ceramic chips disposed below the first green ceramic chip is designated as the third green ceramic chip, and a lower electrode is printed on the surface of the third green ceramic chip facing the first green ceramic chip. A lower electrode d2 is printed for the first temperature sensor w1, and a lower electrode d4 is printed for the second temperature sensor w2. The step of printing the lower electrode d4 on the second temperature sensor w2 may be performed at the same time as or after the step 1023 of printing the lead-out electrode.

The illustrated lower electrode includes a plate-shaped portion and a strip-shaped portion, the plate-shaped portion covers the dielectric via, and the strip-shaped portion extends to the edge of the third green ceramic chip for connecting an external circuit.

In the steps for forming sensors, a method for forming a first pressure sensor yl is the same as a method for forming a second pressure sensor y2 and may include the following steps as shown in FIG. 11.

Step 301, forming a dielectric via on a first green ceramic chip.

The pressure sensor structurally includes an upper electrode, a lower electrode, and a cavity between the upper electrode and the lower electrode. The cavity is located in the dielectric via. As shown in FIGS. 3 to 5, the green ceramic chip used to form the dielectric via is designated as the first green ceramic chip. It should be noted that the first green ceramic chip, the second green ceramic chip and the third green ceramic chip here are only used to distinguish each other in the process of forming the pressure sensor, and not necessarily the same as the first green ceramic chip, the second green ceramic chip and the third green ceramic chip used for forming the temperature sensor. That is to say, the first green ceramic chip in the pressure sensor may be the same as or different from the first green ceramic chip in the temperature sensor; the second green ceramic chip in the pressure sensor may be the same as or different from the second green ceramic chip in the temperature sensor; and the third green ceramic chip in the pressure sensor may be the same as or different from the third green ceramic chip in the temperature sensor.

When the first pressure sensor y1 is formed, the step of forming the dielectric via may be performed at the same time as or after the step 1012 of forming the prefabricated green ceramic chip. Similarly, when the second pressure sensor y2 is formed, the step of forming the dielectric via may also be performed at the same time as or after the step 1012 of forming the prefabricated green ceramic chip. When the step of forming the dielectric via is performed at the same time as the step 1012 of forming the prefabricated green ceramic chip, the first green ceramic chip may be the green ceramic chip formed by cutting a green ceramic tape, while when the step of forming the dielectric via is performed after the step 1012 of forming the prefabricated green ceramic chip, the first green ceramic chip may be the prefabricated green ceramic chip.

Step 302, filling the dielectric via with a carbon film.

Filling the carbon film is to fill the cavity formed by the dielectric via fully, so that the laminated structure will be prevented from deforming due to existence of the cavity when the prefabricated green ceramic chips are laminated.

Step 303, printing an upper electrode on a surface facing the first green ceramic chip of an adjacent second green ceramic chip disposed above the first green ceramic chip, the upper electrode covering the dielectric via and extending to an edge of the second green ceramic chip.

As shown in FIGS. 3 to 5, an adjacent green ceramic chips disposed above the first green ceramic chip is designated as the second green ceramic chip, and an upper electrode is printed on the surface of the second green ceramic chip facing the first green ceramic chip. An upper electrode d5 is printed for the first pressure sensor y1, and an upper electrode d7 is printed for the second pressure sensor y2. The step of printing the upper electrode d7 on the second pressure sensor y2 may be performed at the same time as or after the step 1023 of printing the lead-out electrode.

The illustrated upper electrode includes a plate-shaped portion and a strip-shaped portion, the plate-shaped portion covers the dielectric via, and the strip-shaped portion extends to the edge of the second green ceramic chip for connecting an external circuit.

Step 304, printing a lower electrode on a surface facing the first green ceramic chip of an adjacent third green ceramic chip disposed below the first green ceramic chip, the lower electrode covering the dielectric via and extending to an edge of the third green ceramic chip.

As shown in FIGS. 3 to 5, an adjacent green ceramic chips disposed below the first green ceramic chip is designated as the third green ceramic chip, and an upper electrode is printed on the surface of the third green ceramic chip facing the first green ceramic chip. A lower electrode d6 is printed for the first pressure sensor y1, and a lower electrode d8 is printed for the second pressure sensor y2. The step of printing the lower electrode d8 on the second pressure sensor y2 may be performed at the same time as or after the step 1023 of printing the lead-out electrode.

The illustrated lower electrode includes a plate-shaped portion and a strip-shaped portion, the plate-shaped portion covers the dielectric via, and the strip-shaped portion extends to the edge of the third green ceramic chip for connecting an external circuit.

In the steps for forming sensors, the method for forming a vibration sensor may specifically include the following steps, as shown in FIG. 12.

Step 401, forming a crossed micro-beam on a first green ceramic chip.

The vibration sensor structurally includes an upper electrode, a lower electrode, and a cavity between the upper electrode and the lower electrode. The cavity is located in the dielectric via. As shown in FIGS. 3 to 5, a second dielectric via is a dielectric via used by the vibration sensor to form a cavity. The green ceramic chip used to form the second dielectric via is designated as the third green ceramic chip. In addition, in the vibration sensor z, the first dielectric via is also included, which is formed under the crossed micro-beam L and provides a space for vibration of the micro-beam.

The crossed micro-beam L is formed by extending four strip-shaped ceramic materials outward from the ceramic material in the middle. The ends of the strip-shaped ceramic materials are connected with the surrounding ceramic materials, and the ceramic materials on both sides of the strip-shaped ceramic materials are removed out through a drilling process so as to form a cavity.

The step of forming the crossed micro-beam L may be performed at the same time as or after the step 1012 of forming the prefabricated green chip. When the step of forming the crossed micro-beam L is performed at the same time as the step 1012 of forming the prefabricated green ceramic chip, the first green ceramic chip may be the green ceramic chip formed by cutting a green ceramic tape while when the step of forming the crossed micro-beam L is performed after the step 1012 of forming the prefabricated green ceramic chip, the first green ceramic chip may be the prefabricated green ceramic chip.

Step 402, forming a first dielectric via at a position corresponding to the crossed micro-beam on a second green ceramic chip disposed below the first green ceramic chip.

The step of forming the first dielectric via may be performed at the same time as or after the step 1012 of forming the prefabricated green ceramic chip. When the step of forming the first dielectric via is performed at the same time as the step 1012 of forming the prefabricated green ceramic chip, the second green ceramic chip may be the green ceramic chip formed by cutting a green ceramic tape, while when the step of forming the first dielectric via is performed after the step 1012 of forming the prefabricated green ceramic chip, the second green ceramic chip may be the prefabricated green ceramic chip.

Step 403, forming a second dielectric via at a position corresponding to the crossed micro-beam on a third green ceramic chip disposed above the first green ceramic chip.

The step of forming the second dielectric via may be performed at the same time as or after the step 1012 of forming the prefabricated green ceramic chip. When the step of forming the second dielectric via is performed at the same time as the step 1012 of forming the prefabricated green ceramic chip, the third green ceramic chip may be the green ceramic chip formed by cutting a green ceramic tape, while when the step of forming the dielectric via is performed after the step 1012 of forming the prefabricated green ceramic chip, the third green ceramic chip may be the prefabricated green ceramic chip.

Step 404, filling the first dielectric via and the second dielectric via with a carbon film.

Filling the carbon film is to fill the cavity formed by the dielectric via fully, so that the laminated structure will be prevented from deforming due to existence of the cavity when the prefabricated green ceramic chips are laminated.

Step 405, printing a lower electrode on the crossed micro-beam, the lower electrode extending to an edge of the first green ceramic chip.

As shown in FIGS. 3-5, the ceramic material in the middle of the crossed micro-beam L forms a platform and an electrode printed on the platform serve as the lower electrode d10 of the vibration sensor. This printing step may be performed at the same time as or after the step 1023 of printing the lead-out electrode.

The illustrated lower electrode includes a plate-shaped portion and a strip-shaped portion, the plate-shaped portion covers the dielectric via, and the strip-shaped portion extends to the edge of the first green ceramic chip through a strip of a micro-beam for connecting an external circuit.

Step 406, printing an upper electrode on a surface facing the third green ceramic chip of a fourth green ceramic chip disposed above the third green ceramic chip, the upper electrode covering the second dielectric via and extending to an edge of the fourth green ceramic chip.

As shown in FIGS. 3 to 5, the adjacent green ceramic chip disposed above the third green ceramic chip is designated as the fourth green ceramic chip, and an electrode d9 is printed on the surface of the fourth green ceramic chip facing the third green ceramic chip. The step of printing the upper electrode d9 on the vibration sensor z may be performed at the same time as or after the step 1023 of printing the lead-out electrode.

The illustrated upper electrode includes a plate-shaped portion and a strip-shaped portion, the plate-shaped portion covers the second dielectric via, and the strip-shaped portion extends to the edge of the fourth green ceramic chip for connecting an external circuit.

The above-mentioned temperature sensors, pressure sensors and the vibration sensor are collectively referred to as parameter sensors. The upper and lower electrodes of these parameter sensors can be made of high-temperature-resistant metal materials, such as platinum or gold. However, the present application is not limited to this and any high-temperature-resistant metal material can be used in the present application.

In the above-mentioned ion thrusters, an antenna and passive components, such as LC sensors, can also be integrated to form a wireless passive measurement method.

When the parameter sensors are integrated into the ion thruster in the method described in the above embodiment, both the upper electrode and the lower electrode can be printed. The printed metal layer is very thin and does not increase the size of the laminated structure too much. Further, the method is simple in process, and the dielectric layer (temperature-sensitive ceramic or cavity) between another two electrodes is also formed from a dielectric via on the ceramic chip and not only has a very thin thickness, but also only uses a drilling process which cause low process cost. Therefore, the method for fabricating the ion thruster according to the embodiment of the present application has the advantages of simple process and low cost, and the ion thruster manufactured by the method has a smaller size.

As shown in FIGS. 1 to 6, an embodiment further provides an ion thruster, which is manufactured by the method for fabricating the ion thruster described in the above embodiments.

In an embodiment, the ion thruster includes a main cathode 1, a main anode 2, a lead-out electrode 3, a permanent magnet, and a body 5 formed by stacking, laminating and co-firing a plurality of prefabricated green ceramic chips p. The body 5 includes a front portion 51, a tail portion 52 and a middle portion 53 located between the front portion 51 and the tail portion 52, and the middle portion 53 is provided therein with a hollow reaction chamber c.

The front portion 51 is formed with a cathode hole k1 and an air intake hole k2 which communicate with the reaction chamber c. The main cathode 1 extends into the reaction chamber c through the cathode hole k1 and is fixed in the cathode hole k1. A permanent magnet slot k3 is formed on an outer surface of the middle portion 53, and the permanent magnet is fixed in the permanent magnet slot k3 for forming a magnetic field in the reaction chamber c. The middle portion 53 includes a tapered portion b1 connecting the front portion 51 and a barrel portion b2 connecting the tail portion. The main anode 2 is attached to the inner wall surface of the tapered portion bl; and the lead-out electrode 3 is electrically connected to the main anode 2 after penetrating through the tapered portion b1.

The tail portion 52 includes an accelerating grid anode s1 and an accelerating grid cathode s2 having a plurality of jet orifices k4 and oppositely arranged at a certain distance for forming an electric field in the tail portion 52.

When the above-mentioned ion thruster is operating, as shown in FIGS. 1 and 2, a fuel gas enters the reaction chamber c through the air inlet hole k2, and the main anode 2 is attached to the inner wall surface of the tapered portion b1 and is electrically connected to the power supply anode outside the body 5 via a lead-out electrode 3 penetrating through the tapered portion b1; a permanent magnet is fixed in the permanent magnet slot k3 on the outer surface of the middle portion 53 of the body 5 for generating a magnetic field in the reaction chamber c. The main cathode 1 will release electrons after being electrically connected to a cathode of the power supply, the electrons will accelerate motion towards the main anode 2 under the action of electric field formed by the main cathode 1 and the main anode 2, and the cyclotron motion generated due to the Lorentz force under the action of the magnetic field will increase a probability of the electrons colliding with the gas molecules of the fuel gas in the reaction chamber c. After the electrons collide with the gas molecules, positively charged gas cations and free electrons will be generated, and the positively charged gas cations are ejected from the tail portion at a high speed through the jet orifice k4 to form thrust after being accelerated by an electric field formed by the accelerating grid anode s1 and the accelerating grid cathode s2 of the tail portion 52 of the body 5.

The green ceramic chips can be obtained by cutting ALN (aluminum nitride) or $AL_2O_3$ (aluminum oxide) green ceramic tapes. The cut green ceramic chips also need to drilled to form the required via, thereby form prefabricated green ceramic chips. The prefabricated green ceramic tape in the present application is not limited to be made of ALN or $AL_2O_3$, and can also be made of other materials known to those skilled in the art.

In the above lamination process, the prefabricated green ceramic chips stacked together are extruded, so that the interstitial air between the layers is exhausted. The above-mentioned co-fired process can be a low-temperature co-fired process (LTCC), or a high-temperature co-fired process (HTCC), used to fire laminated prefabricated green ceramic chips into one piece to form a body 5 of ceramic material.

In the ion thruster according to the present application, since a plurality of prefabricated green ceramic chips are stacked together when forming the body, and then laminated and co-fired to form a body composed of a ceramic material. The ceramic material is cheap, which significantly reduce the cost of the ion thruster. In addition, since the ion thruster is formed only by simply stacking, laminating and co-firing, the method is simple in process. The co-fired process can be a high-temperature co-fired process or a low-temperature co-fired process and the fired ceramic material has the advantages of corrosion resistance, high temperature resistance, long service life, good thermal conductivity, etc., so the fabricated ion thruster also has good high temperature resistance.

As described in the above embodiments, the ion thruster can also have a smaller size so as to be suitable for different occasions.

The above-mentioned ion thruster may also include a plurality of parameter sensors. The parameter sensors are used to detect parameter information such as temperature, pressure, and vibration. The parameter sensors include an upper electrode, a lower electrode, and a dielectric layer between the upper electrode and the lower electrode. In an embodiment, the parameter sensor may be a temperature sensor, a pressure sensor or a vibration sensor.

When the parameter sensor is a temperature sensor, a first temperature sensor wl can be provided on the front portion 51 for detecting the ambient temperature around the front portion 51 to prevent the ion thruster from being damaged due to excessive temperature of the environment where the ion thruster is operating. In addition, a second temperature sensor w2 may also be provided in the middle portion 53 for detecting the temperature of the reaction chamber c in the middle portion 53 to prevent the ion thruster being damaged due to too high chamber temperature.

The first temperature sensor w1 includes an upper electrode d1, a lower electrode d2, and a temperature sensitive ceramic j1 located between the upper electrode dl and the lower electrode d2. The temperature-sensitive ceramic, also known as a thermo-sensitive ceramic, is a kind of material having a resistivity changing significantly with temperature. It can be used to fabricate temperature sensors and perform temperature measurement, line temperature compensation and frequency stabilization. The temperature-sensitive ceramic j1 is filled in a cavity in the ceramic material of the front portion 51.

The second temperature sensor w2 has the same structure as the first temperature sensor w1, and also includes an upper electrode d3, a lower electrode d4, and a temperature-sensitive ceramic j2 located between the upper electrode d3 and the lower electrode d4. The temperature-sensitive ceramic j2 is filled in a cavity in the ceramic material of the middle portion 53. Since the first temperature sensor w1 is configured to detect the ambient temperature around the front portion 51, a set position of the first temperature sensor w1 is closer to the outer surface of the front portion 51, that is, the cavity where the temperature-sensitive ceramic j1 is located is closer to the front portion 51. Since the second temperature sensor w2 is configured to detect the chamber temperature of the reaction chamber c in the middle portion 53, a set position of the second temperature sensor w2 is closer to the inner surface of the middle portion 53, making it closer to the reaction chamber c, that is, the cavity where the temperature-sensitive ceramic j2 is located is closer to the inner surface of the middle portion 53.

When the parameter sensor is a pressure sensor, a first pressure sensor y1 can be provided on the front portion 51 for detecting the ambient pressure around the front portion 51 to prevent the ion thruster from being damaged due to excessive pressure of the environment where the ion thruster is operating. In addition, a second pressure sensor y2 may also be provided in the middle portion 53 for detecting the pressure of the reaction chamber c in the middle portion 53 to prevent the ion thruster being damaged due to too high chamber pressure.

The first pressure sensor y1 includes an upper electrode d5, a lower electrode d6, and an air gap j3 between the upper electrode d5 and the lower electrode d6. The air gap j3 is located in a cavity in the ceramic material of the front portion 51. When the ambient pressure changes, the ceramic material is deformed by force and the cavity is deformed, so that the thickness of the air gap j3 between the upper electrode d5 and the lower electrode d6 is changed, thereby changing an electrical parameter of the first pressure sensor y1.

The second pressure sensor y2 has the same structure as the first pressure sensor y1, and also includes an upper electrode d7, a lower electrode d8, and an air gap j4 between the upper electrode d7 and the lower electrode d8. The air gap j4 is located in a cavity in the ceramic material of the middle portion 53. When the ambient pressure changes, the ceramic material is deformed by force and the cavity is deformed, so that the thickness of the air gap j4 between the upper electrode d7 and the lower electrode d8 is changed, thereby changing an electrical parameter of the second pressure sensor y2.

Since the first pressure sensor y1 is configured to detect the ambient pressure around the front portion 51, a set position of the first pressure sensor y1 is closer to an outer surface of the front portion 51, that is, the cavity is located is closer to the outer surface of the front portion 51. Since the second pressure sensor y2 is configured to detect the internal pressure of the reaction chamber c inside the middle portion 53, a set position of the second pressure sensor y2 is closer to the inner surface of the middle portion 53, making it closer to the reaction chamber c, that is, the cavity where the air gap j4 is located is closer to the inner surface of the middle portion 53.

When the parameter sensor is a vibration sensor, the vibration sensor z can be provided on the front portion 51 for detecting the ambient vibration around the front portion 51 to prevent the ion thruster from being damaged due to excessive vibration of the environment where the ion thruster is operating.

The vibration sensor z includes an upper electrode d9, a lower electrode d10 and an air gap j5 between the upper electrode d9 and the lower electrode d10. The air gap j5 is located in the cavity in the ceramic material of the front portion 51. Unlike the pressure sensor, the lower electrode d10 is formed on the cross micro-beam L. The crossed micro-beam L is formed by extending four strip-shaped ceramic materials outward from the ceramic material in the middle. The ends of the strip-shaped ceramic materials are connected with the surrounding ceramic materials, and the ceramic materials on both sides of the strip-shaped ceramic materials are removed out so as to form a cavity. In addition, cavities are formed at a position above and below the crossed micro-beam L, so that the crossed micro-beams L will vibrate when the environment where the ion thruster is located vibrates. The lower electrode d10 of the vibration sensor z is formed on the ceramic material in the middle of the crossed micro-beam L, a cavity is formed above the lower electrode d10, an air gap j5 serves as a dielectric layer of the vibration sensor z, and the upper electrode d9 is formed above the cavity. The vibration of the crossed micro-beams L changes the thickness of the air gap j5, which in turn changes the electrical parameters of the vibration sensor z.

In the above-mentioned ion thrusters, an antenna and passive components, such as LC sensors, can also be integrated to form a wireless passive measurement method.

It should be noted that although the cavities for accommodating the dielectric layer in each parameter sensor shown in the figure are all square, and the present application is not limited to this, and the cavities can be set to any shape as required. Although each upper electrode and each lower electrode of the parameter sensors shown in the figure are all squares, the present application is not limited to this, the shape of the upper electrode and the lower electrode can be set to any shape that can cover the dielectric layer as required; and the position of the cavity for accommodating the dielectric layer is not limited to the position shown in the figure, it can be any position that can realize the corresponding parameter detection.

In the above embodiment, the upper electrode and the lower electrode can be made of high temperature resistant metal materials, such as platinum or gold. However, the present application is not limited to this, and any high temperature resistant metal materials can be used in the present application.

In the above-mentioned ion thruster, the air intake hole k2 shown in FIGS. 3 and 5 includes a plurality of small circular holes o1 surrounding the cathode hole k1, and a large circular hole o1 that can surround these small circular holes o1 and the cathode hole k1. The air intake hole k2 further includes a gas channel o3 formed on a side wall of the front portion 51, and the gas channel o3 is communicated with the large circular hole o2, so that the external fuel gas can be transmitted to the large circular hole o2 through the gas channel o3, and then can enter the small circular hole o1.

As shown in FIGS. 3 and 5, a plurality of small circular holes o1 evenly surround around the cathode hole k1, so that the fuel gas can be evenly distributed after entering the reaction chamber c, and it is convenient for electrons generated by the main cathode 1 to collide with many gas molecules.

In the above-mentioned embodiment, the ion thruster may further include a neutralizer pipeline 6, as shown in FIG. 2, located on a side of the tail portion 52 and configured to eject negatively charged ions around the tail portion 52. These negatively charged ions are configured to neutralize the positively charged gas cations ejected from the tail portion 52.

Finally, it should be noted that the above embodiments are only used to explain the technical solutions of the present application, and are not limited thereto; although the present application is described in detail with reference to the foregoing embodiments, it should be understood by those skilled in the art that they can still modify the technical solutions described in the foregoing embodiments and make equivalent replacements to a part of the technical features and these modifications and substitutions do not depart from the scope of the technical solutions of the embodiments of the present application.

What is claimed is:

1. A method for fabricating an ion thruster, comprising:

a first step of stacking and laminating a first plurality of prefabricated green ceramic chips to form a front portion, the front portion including a cathode hole and an air intake hole;

a second step of stacking and laminating a second plurality of prefabricated green ceramic chips to form a rear portion, the rear portion including a middle portion in which a reaction chamber is located and a tail portion, the middle portion including a tapered portion and a barrel portion;

wherein a prefabricated carbon block having a profile matched with a matching profile of the reaction chamber is placed inside the reaction chamber and an anode metal layer is formed on a surface of the prefabricated carbon block at a position corresponding to the tapered portion; and wherein the tail portion includes an accelerating grid cathode and an accelerating grid anode having a plurality of jet orifices, with the accelerating grid anode and the accelerating grid cathode oppositely arranged at a certain distance, a lead-out electrode passing through the tapered portion, and a permanent magnet slot being formed on an outer surface of the middle portion;

a third step of assembling the front portion and the rear portion and placing both into a sintering mold, and allowing the front portion to be closely fitted with the tapered portion of the rear portion such that the cathode hole and the air intake hole communicate with the reaction chamber;

a fourth step of placing a main cathode into the cathode hole and filling the cathode hole with a ceramic slurry to fix the main cathode; and a fifth step of placing the sintering mold in a heating furnace for sintering.

2. The method of claim 1, the first step further comprising:

cutting a green ceramic tape to form a first plurality of green ceramic chips;

forming a respective via and/or opening at a respective designated position of each green ceramic chip of the first plurality of the green ceramic chips to form the first plurality of prefabricated green ceramic chips;

filling the respective via and/or opening with a respective carbon film; and aligning the first plurality of prefabricated green ceramic chips such that the respective vias align to, form the cathode hole, and such that the respective openings and the via to form the air intake hole.

3. The method of claim 1, the second step further comprising:

cutting a green ceramic tape to form a second plurality of green ceramic chips, a first portion of the second plurality of green ceramic chips having gradually increasing outline size, a second portion of the second plurality of green ceramic chips having another outline size the same as an outline size of the largest green ceramic chip among the first portion;

forming a respective opening and/or a respective via at a respective designated position of each green ceramic chip of the second plurality of the green ceramic chips to form the second plurality of a prefabricated green ceramic chips and to form openings or vias for the second plurality of a prefabricated green ceramic chips;

printing a lead-out electrode on each prefabricated green ceramic chip of the second plurality of prefabricated green ceramic chips;

stacking the prefabricated green ceramic chips made with the first portion to form the tapered portion, the lead-out electrode being formed on the tapered portion;

stacking and laminating the prefabricated green ceramic chips made with the second portion to form the barrel portion, aligning the vias of the tapered portion and the vias of the barrel portion to form the reaction chamber, and wherein the openings and or vias form the permanent magnet slot;

filling the respective via of a prefabricated green ceramic chip with a carbon film, printing a grid metal layer on a surface of the prefabricated green ceramic chip filled with the carbon film to form the accelerating grid cathode and the accelerating grid anode, and allowing via filled with carbon film to form jet orifices;

sequentially stacking and laminating the accelerating grid anode, the prefabricated green ceramic chips, and the accelerating grid cathode to form the tail portion; and sequentially stacking together and laminating the tapered portion, the barrel portion, the prefabricated carbon block, and the tail portion.

4. The method of any one of claims 1 to 3, the first step further comprising: before laminating the first plurality of prefabricated green ceramic chips, forming a first temperature sensor, a first pressure sensor and a vibration sensor; and the second step further comprising: before laminating the second plurality of prefabricated green ceramic chips, forming a second temperature sensor and a second pressure sensor.

5. The method of claim 4, wherein the first step of comprising forming the first temperature sensor or the step of forming the second temperature sensor further comprises:

forming a dielectric via on a first green ceramic chip of the first plurality of prefabricated green ceramic chips or the second plurality of prefabricated green ceramic chips;

filling the dielectric via with a temperature-sensitive ceramic;

printing an upper electrode on a surface facing the first green ceramic chip of the first plurality of prefabricated green ceramic chips or the second plurality of prefabricated green ceramic chips of an adjacent second green ceramic chip of the first plurality of prefabricated green ceramic chips or the second plurality of prefabricated green ceramic chips disposed above the first green ceramic chip of the first plurality of prefabricated green ceramic chips or the second plurality of prefabricated green ceramic chips, the upper electrode covering the dielectric via and extending to an edge of the adjacent second green ceramic chip of the first plurality of prefabricated green ceramic chips or the second plurality of prefabricated green ceramic chips; and printing a lower electrode on a surface facing the first green ceramic chip of an adjacent third green ceramic chip disposed below the first green ceramic chip, the lower electrode covering the dielectric via and extending to an edge of the adjacent third green ceramic chip.

6. The method of claim 4, wherein the first step comprising forming the first pressure sensor or the second pressure sensor further comprises:

forming a dielectric via on a first green ceramic chip of the first plurality of prefabricated green ceramic chips or the second plurality of prefabricated green ceramic chips;

filling the dielectric via with a carbon film;

printing an upper electrode on a surface facing the first green ceramic chip of the first plurality of prefabricated green ceramic chips or the second plurality of prefabricated green ceramic chips of an adjacent second green ceramic chip of the first plurality of prefabricated green ceramic chips or the second plurality of prefabricated green ceramic chips disposed above the first green ceramic chip of the first plurality of prefabricated green ceramic chips or the second plurality of prefabricated green ceramic chips, the upper electrode covering the dielectric via and extending to an edge of the adjacent second green ceramic chip of the first plurality of prefabricated green ceramic chips or the second plurality of prefabricated green ceramic chips; and printing a lower electrode on a surface facing the first green ceramic chip of the first plurality of prefabricated green ceramic chips or the second plurality of prefabricated green ceramic chips of an adjacent third green ceramic chip of the first plurality of prefabricated green ceramic chips or the second plurality of prefabricated green ceramic chips disposed below the first green ceramic chip of the first plurality of prefabricated green ceramic chips or the second plurality of prefabricated green ceramic chips, the lower electrode covering the dielectric via and extending to an edge of the adjacent third green ceramic chip of the first plurality of prefabricated green ceramic chips or the second plurality of prefabricated green ceramic chips.

7. The method of claim 4, wherein the first step comprising forming the vibration sensor further comprises:

forming a crossed micro-beam on a first green ceramic chip of the first plurality of prefabricated green ceramic chips;

forming a first dielectric via at a position corresponding to the crossed micro-beam on a second green ceramic chip of the first plurality of prefabricated green ceramic chips disposed below the first green ceramic chip of the first plurality of prefabricated green ceramic chips;

forming a second dielectric via at a position corresponding to the crossed micro-beam on a third green ceramic chip of the first plurality of prefabricated green ceramic chips disposed above the first green ceramic chip of the first plurality of prefabricated green ceramic chips;

filling the first dielectric via and the second dielectric via with a carbon film;

printing a lower electrode on the crossed micro-beam, the lower electrode extending to an edge of the first green ceramic chip of the first plurality of prefabricated green ceramic chips; and printing an upper electrode on a surface facing the third green ceramic chip of the first plurality of prefabricated green ceramic chips of a fourth green ceramic chip of the first plurality of prefabricated green ceramic chips disposed above the third green ceramic chip, the upper electrode covering the second dielectric via and extending to an edge of the fourth green ceramic chip of the first plurality of prefabricated green ceramic chips.

8. The method of claim 1, further comprising: placing a permanent magnet in the permanent magnet slot.

9. An ion thruster, being fabricated by the method claim 1.

10. The ion thruster of claim 9, further comprising: a neutralizer pipeline located on a side of the tail portion and configured to eject negatively charged ions around the tail portion.

* * * * *